United States Patent [19]

Kanai

[11] 4,051,542

[45] Sept. 27, 1977

[54] MAGNETIC HEAD WITH THIN SHEET EXHIBITING MAGNETORESISTIVE PROPERTY

[75] Inventor: Kenji Kanai, Neyagawa, Japan

[73] Assignee: Matsushita Electric Industrial Co., Ltd., Japan

[21] Appl. No.: 605,223

[22] Filed: Aug. 18, 1975

[30] Foreign Application Priority Data

Aug. 20, 1974 Japan .................................. 49-95762
Aug. 20, 1974 Japan .................................. 49-95763
Aug. 20, 1974 Japan .................................. 49-95764

[51] Int. Cl.² ............................ G11B 5/12; G11B 5/22
[52] U.S. Cl. ................................ 360/113; 338/32 R
[58] Field of Search .......................... 360/113; 324/46; 338/32 R; 340/174 EB

[56] References Cited

U.S. PATENT DOCUMENTS

| 3,274,575 | 9/1966 | De Koster | 360/113 |
| 3,493,694 | 2/1970 | Hunt | 360/113 |
| 3,881,190 | 4/1975 | Brock et al. | 360/113 |
| 3,887,945 | 6/1975 | Nepela | 360/113 |
| 3,945,038 | 3/1976 | Lazzari | 360/113 |
| 3,967,368 | 7/1976 | Brock et al. | 360/113 |

Primary Examiner—Alfred H. Eddleman
Attorney, Agent, or Firm—Burgess, Ryan and Wayne

[57] ABSTRACT

A thin ferromagnetic sheet or layer exhibiting magnetoresistance property is connected in the magnetic circuit of a magnetic head including a head or air gap, and a pair of current terminals are attached to the thin ferromagnetic sheet and spaced apart by a predetermined distance from each other so as to flow the current of a predetermined magnitude through the thin ferromagnetic sheet, whereby the variation in magnetic field produced by a magnetic recording medium passing over the head or air gap may be detected in terms of the voltage variation between the current terminals.

6 Claims, 14 Drawing Figures

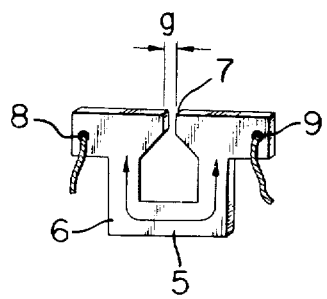
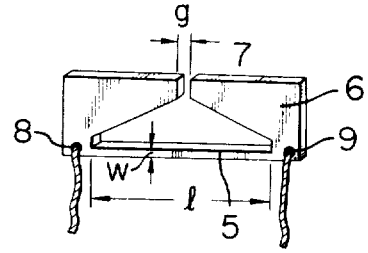
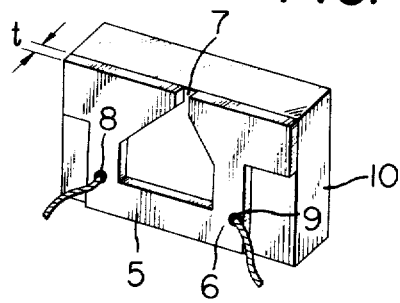
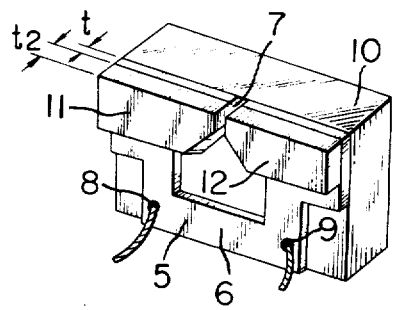
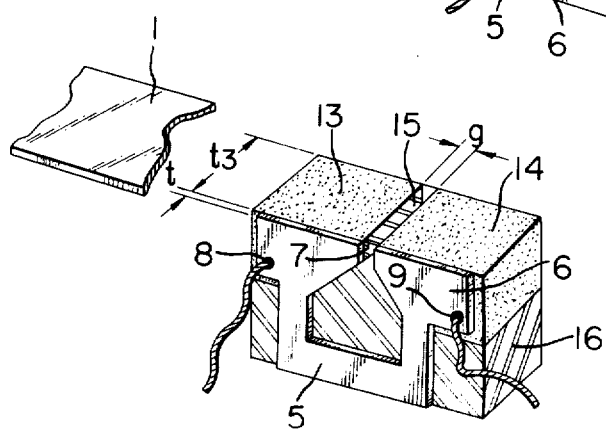

4,051,542

MAGNETIC HEAD WITH THIN SHEET EXHIBITING MAGNETORESISTIVE PROPERTY

BACKGROUND OF THE INVENTION

The present invention relates to an improvement of a magnetic head utilizing magnetoresistance.

The underlying principle of the magnetic heads of the type described is that the current resistance or conductivity varies in a ferromagnetic material such as permalloy when a magnetic field is applied thereto. The conventional magnetic heads utilizing magnetoresistance consist of, in general, a thin ferromagnetic sheet which is made into contact with or spaced apart by a very close distance from a magnetic recording medium transported in one direction, and a pair of current terminals attached to the thin ferromagnetic sheet and spaced apart from each other by a suitable distance in the longitudinal direction thereof for flowing the current of a predetermined magnitude through the thin ferromagnetic sheet, whereby the variation in magnetic field produced by the magnetic recording medium passing over the thin ferromagnetic sheet may be detected as the variation in voltage or resistance between the current terminals. When the narrower side surface of the thin ferromagnetic sheet is made into contact with the magnetic recording medium, the magnitude of the magnetic field produced thereby is exponentially reduced in the direction vertical to the surface of the recording medium. Therefore, when the wavelength of the signal recorded on the magnetic recording medium is short, the magnetic field is too much reduced to obtain the satisfactorily strong signal. To overcome this problem, there has been proposed a method in which one of the major surfaces of the thin ferromagnetic sheet is made into contact with the magnetic recording medium, but the abrasion and wear are so pronounced, thus resulting in a very short service life as will be described in detail hereinafter.

SUMMARY OF THE INVENTION

One of the objects of the present invention is therefore to provide a magnetic head which may minimize the abrasion and wear of its thin ferromagnetic sheet or layer (to be referred to as "sheet" hereinafter for brevity) and which may detect very efficiently the variation in magnetic field produced in the head by a magnetic recording medium.

Another object of the present invention is to provide a magnetic head which is very simple in construction yet very stable and dependable in operation.

To attain the above and other objects, the present invention provides a magnetic head comprising a thin ferromagnetic sheet connected in a magnetic circuit of the head including an air or head gap, and a pair of current terminals or electrodes attached to the thin ferromagnetic sheet and spaced apart from each other by a predetermined distance in a predetermined direction so as to flow the current of a predetermined magnitude through the thin ferromagnetic sheet, whereby the variation in magnetic field produced by the magnetic recording medium passing over the head or air gap may be detected in terms of the voltage difference between the current terminals.

BRIEF DESCRIPTION OF THE DRAWING

FIG. 7 is a graph used for the explanation thereof;

FIG. 3 is a schematic perspective view of a first embodiment of the present invention;

FIGS. 4 through 8 are schematic views of a second to sixth embodiments of the present invention, respectively;

DESCRIPTION OF THE PREFERRED EMBODIMENTS

Figure 1A:
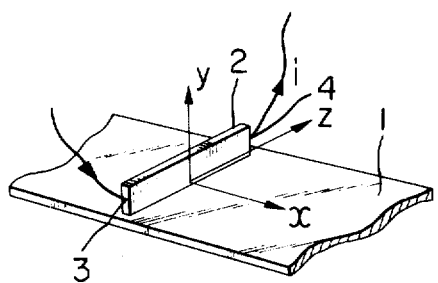
FIGS. 1(A) and 1(B) are schematic perspective views of the prior art magnetic heads utilizing magnetoresistance.
Figure 1B:
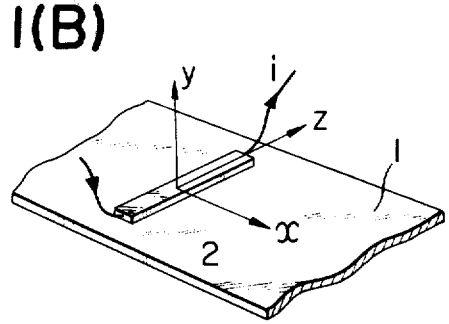
Figure 2:
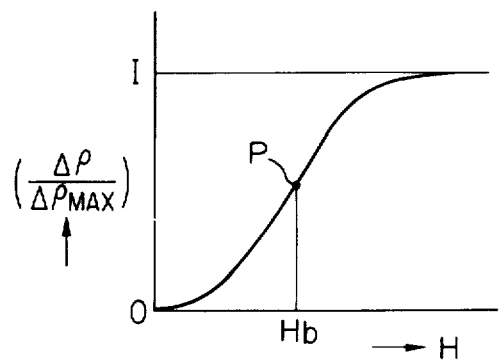

Prior Art, FIGS. 1 and 2

Prior to the description of the preferred embodiments of the present invention, the prior art magnetic heads will be described briefly in order to point out distinctly and specifically point out the novel features of the magnetic heads according to the present invention.

First referring to FIG. 1(A), a magnetoresistance element 2 consisting of a thin ferromagnetic sheet is placed in contact with or spaced apart by a very close distance from a magnetic recording medium or tape 1 in the direction Y perpendicular thereto, and current terminals or electrodes 3 and 4 are attached to both ends of the magnetoresistance element 2 and spaced apart from each other in the longitudinal direction Z thereof. The constant current $i$ flows from the electrode 3 to the electrode 4 so that the variation in resistance in the direction Z due to the variation in magnetic field in the direction Y may be detected in terms of the variation in voltage or current. In the magnetic head of the type described, the magnitude of the magnetic field produced by the magnetic tape 1 decreases exponentially in the direction of the element 2 (whose width in the Y direction in denoted by W). Especially when the wavelength of the signal recorded on the magnetic tape 1 is short, the considerably greater attenuation or damping occurs in the Y direction. To overcome this problem, there has been proposed the magnetic head of the type shown in FIG. 1(B). That is, the magnetoresistance element 2 is placed in parallel with the surface of the magnetic tape 1 so that the attenuation or damping of the magnetic field in the Y direction may be minimized. However, since the element 2 consists of, in general, a thin ferromagnetic sheet, and is made into contact with the magnetic tape 1 so that the rapid abrasion and wear of the element 2 occurs. The variation in magnetoresistance $\Delta P$ of the element 2 and the angle $\theta$ between the direction of the magnetization and the direction of current flow may be expressed as follows:

$$\Delta P = a + b \cos^2 \theta$$

where $a$ and $b$ = constants.

The relation between the applied magnetic field and the change in resistance $\Delta P$ is shown in FIG. 2. It is seen that the characteristic curve is considerably non-linear. In order to increase the dynamic range as wide as possible, it is therefore required to select the operating point at the point P in FIG. 2 by applying the bias magnetic field Hb. For this purpose, means for applying the bias magnetic field must be additionally provided so that the overall construction of the magnetic head is very complex.

The Invention, First Embodiment, FIG. 3

FIG. 3 shows the fundamental arrangement of the magnetic heads according to the present invention. A thin sheet 6 made of a ferromagnetic material such as permalloy establishes a closed magnetic circuit consisting of a magnetoresistance section 5 and an air gap 7 with a gap width g, and current electrodes 8 and 9 are attached to the thin ferromagnetic sheet 6 and spaced apart from the air gap 7 by a predetermined distance. The constant current flows between the electrodes 8 and 9 so that the change in resistance in the thin ferromagnetic sheet 6 due to the change in magnetic field over the air gap 7 may be detected in terms of the voltage difference between the terminals 8 and 9 when the magnetic recording medium is transported in one direction in contact with the air gap 7.

Second Embodiment, FIG. 4

The second embodiment shown in FIG. 4 is substantially similar in construction to the first embodiment shown in FIG. 3 except that the width W of the magnetoresistance section 5 is reduced as much as possible while the length $l$ is increased as practically as possible so that the resistance of the section 5 may be increased as much as possible. Since the section 5 is defined by the straight lines, it may have the same orientation so that the fabrication of the thin ferromagnetic sheet 6 may be much facilitated and that the method for applying a suitable bias may be much simplified.

Third Embodiment, FIG. 5

The third embodiment shown in FIG. 5 is also substantially similar in construction to the first embodiment except that the thin ferromagnetic sheet 6 is deposited by the suitable vacuum evaporation process upon a non-magnetic base or mount 10. It should be noted that the track width $t$ of the magnetic head is equal to the thickness of the thin ferromagnetic sheet 6.

Fourth Embodiment, FIG. 6

The fourth embodiment shown in FIG. 6 is substantially similar in construction to the third embodiment shown in FIG. 5 except that magnetic flux converging cores 11 and 12 of a thickness $t_2$ are attached on the thin ferromagnetic sheet 6 and spaced apart from each other by a distance equal to the gap height g of the air gap 7. Therefore the magnetic head of the fourth embodiment has a track width equal to $t + t_2$.

Fifth Embodiment, FIG. 7

The underlying principle of the fifth embodiment shown in FIG. 7 is similar to that of the fourth embodiment shown in FIG. 6. That is, magnetic cores 13 and 14, which correspond to the cores 11 and 12 of the fifth embodiment, are mounted on a base or reinforcing member 16 and are spaced apart from each other by a distance g equal to the gap width of the air gap 7 of the thin ferromagnetic sheet 6 attached to the cores 14 and 15 and the base 16. The gap 7 of the thin ferromagnetic sheet 6 is of course made in alignment with the gap 15 between the cores 13 and 14.

The above magnetic heads according to the present invention has not only a less shape effect loss which is dependent upon the relation between the wavelength of the signal recorded on the magnetic tape and the length of contact between the magnetic tape and the magnetic head but also less separation loss.

Figure 8:
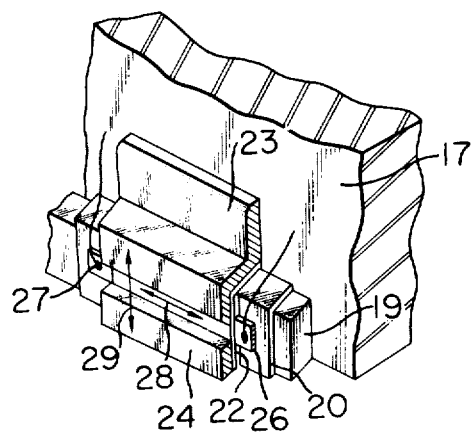
Figure 9:
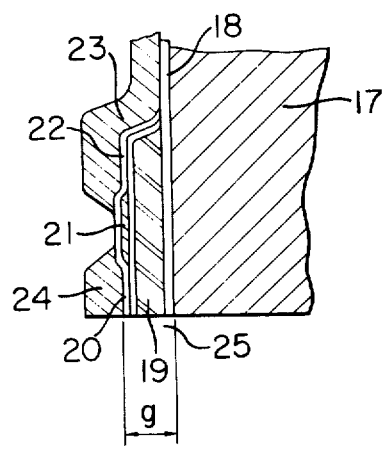
FIG. 9 is a sectional view of the sixth embodiment shown in FIG. 8.

Sixth Embodiment, FIGS. 8 and 9

The sixth embodiment of the present invention shown in FIGS. 8 and 9 comprises a base 17 made of a magnetic material, a first insulating layer 18 formed thereupon, a strip-shaped conducting layer 19 formed upon the first insulating layer 18 and a second insulating layer 20 formed upon the conducting layer 19. The lower sides of the first and second insulating layers 18 and 20 and the conducting layer 18 are formed in coplanar relation with the bottom of the base 17. The magnetic head further comprises a thin ferromagnetic sheet 21 formed upon the second insulating layer 20 and substantially in parallel with the longitudinal axis of the conducting layer 19, and a third insulating layer 22 formed upon the thin ferromagnetic sheet 21 and the second insulating layer 20. The magnetic head further includes a first core 23 whose one and (upper end) is magnetically coupled to the base 17 and whose the other and (lower end) is magnetically coupled to the thin ferromagnetic sheet 21, and a second core 24 whose one end (upper end) is magnetically coupled to the thin ferromagnetic sheet 21 and whose lower side surface is made in coplanar relation with the bottom of the base 17. The lower side of the third insulating layer 22 is also in coplanar relation with the bottom of the base 17. The magnetic head with the above construction establishes a closed magnetic circuit from the magnetic base 17, the first core 23, the thin ferromagnetic sheet 21, the second core 24, the air gap 25 with a gap width g (which is defined by the first, second and third insulating layers 18, 20 and 21 and the conducting layer 19) and back to the base 17. Electrodes 26 and 27 are attached to the ends of the thin ferromagnetic sheet 21.

Next the mode of operation will be described. As the magnetic recording medium or tape passes over the head gap 25, it produces a magnetic field in the magnetic head so that the magnetic flux flows through the thin ferromagnetic sheet 21. Therefore when the current flows through the thin ferromagnetic sheet 21, the variation in magnetic flux may be detected in terms of the variation in resistance. When the current is applied to the conducting layer 19, the bias magnetic fields may be produced in the directions indicated by the double-pointed arrow 29 within the ferromagnetic sheet 21.

The head gap of the magnetic head with the above construction may be in direct contact with the magnetic recording medium or may be spaced apart therefrom by a very cose distance so that the magnetic flux flowing through the thin ferromagnetic sheet 21 may be effectively increased in magnitude. Therefore, the separation loss may be minimized. Furthermore, the core 24 which is in contact with the magnetic recording medium may have a great thickness so that the wavelength at which appears the shape effect of the magnetic head may be considerably increased. Thus the magnetic heads in accordance with the present invention may ensure the stable recording and reproducing characteristics. Furthermore, with the magnetic heads according to the present invention, the bias magnetic field may be applied in a simple manner in order to overcome the non-linear relationship between the variation in resistance and the applied magnetic field. When the thin ferromagnetic sheet 21 has a thickness thinner than that of the core 24, the bias magnetic field which appears at the head gap may be minimized. It is preferable that the magnitude of the voltage detected by the magnetic head be as high as possible. For this purpose, the thickness of the thin ferromagnetic sheet 21 must be reduced as practically as possible so that the resistance may be increased. Therefore, it is preferable that the thin ferromagnetic sheet 21 be formed by the vacuum evaporation or electroplating process. Furthermore in order to increase the variation in resistance with respect to the applied magnetic field and to avoid the adverse effect of the hysteresis, it is preferable that the thin ferromagnetic sheet may be oriented in the direction of the axis of the uniaxial anisotropy and in the direction indicated by the arrow 28 in FIG. 8 and perpendicular to the direction of the flux because the direction of magnetization rotates as the magnetic field is applied. Therefore according to the present invention, the base is heated in excess of its Curie temperature when the thin ferromagnetic film is deposited while the magnetic field is applied thereto. Thus the thin ferromagnetic sheet 21 may be oriented in the direction indicated by the arrow 29; that is, in the direction perpendicular to the magnetic flux. When the thin ferromagnetic sheet 21 is formed in the manner described above, the applied magnetic field is not absorbed by the magnetic base 17, but is effectively applied to the deposited film.

Seventh Embodiment, FIGS. 10 - 13

Figure 10:
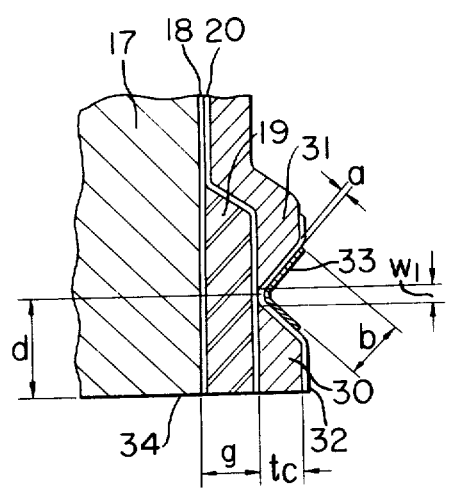
FIG. 10 is a fragmentary sectional view of a seventh embodiment of the present invention.

The seventh embodiment shown in cross section in FIG. 10 is substantially similar in construction to the sixth embodiment described above. That is, the base 17 consists of monocrystalline or polycrystalline ferrite, and the first insulating layer 18 consisting of SiO or $SiO_2$ is formed thereupon. Upon the first insulating layer 18 is formed by the vacuum evaporation or electroplating process the conducting layer 19 consisting of Al, Cu or Cr. If required, the conducting layer 19 is etched by a suitable conventional method. Upon the conducting layer 19 is formed the second insulating layer 20, and a thin layer of a ferromagnetic material such as permalloy, sendust or ferrite is formed thereupon and is etched to form a groove of a width $w_l$ to form magnetic cores 30 and 31. The opposing side surfaces of the magnetic cores 30 and 31 are further etched to form a V-shaped groove. Upon the magnetic cores 30 and 31 including surfaces of the V-shaped groove is formed the insulating layer 32 of a thickness $a$, and upon the surface of the V-shaped groove is formed a thin magnetic layer consisting of Fe-Ni or Ni-Co. The width $b$ of the thus formed magnetoresistance element 33 is greater than the thickness $tc$ of the magnetic core 30. The conducting layer 19, the magnetic cores 30 and 31, and the magnetoresistance element 33 are arrayed in parallel with each other in the longitudinal direction of the surface 34 which is made into contact with the recording medium. Instead of the magnetic base 17, a non-magnetic base coated with a magnetic film may be used.

Figure 11:
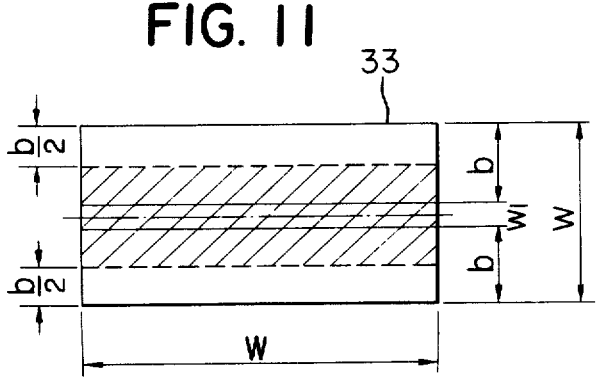
FIG. 11 is a view used for the explanation thereof.
Figure 12:
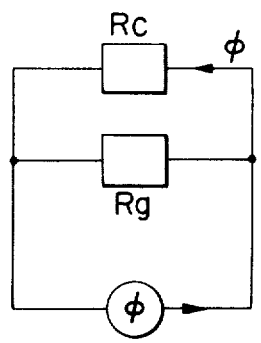
FIG. 12 is a magnetic equivalent circuit thereof.
Figure 13:
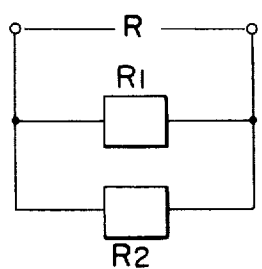
FIG. 13 is an electrical equivalent circuit thereof.

FIG. 11 is a developed view of the magnetoresistance element. W denotes the track width while $w$, the width of the element 33. The effective magnetic flux passes through the hatched area with a width $(w - b)$ shown in FIG. 11, and the magnetic flux passing through the area outside of the hatched area may be approximated zero. In other words, the resistance of the center portion of the element 33 varies as the applied magnetic field varies. The relationship between the variation in resistance and the applied magnetic field may be obtained from the magnetic equivalent circuits of the head and element 33 shown in FIGS. 12 and 13, respectively. In FIGS. 12 and 13, Rg denotes magnetic reluctance of the head gap $g$; Rc, that of the area of the element 32 through which the flux passes; $\Phi$, flux from the magnetic recording medium; and $\phi$, flux passing through the element 33 in the direction of its width. These magnitudes may be obtained by approximation as follows:

$$R_g = \frac{g}{\mu_o d W}$$

$$R_c = \frac{a}{\mu_o b W}$$

$$R_1 = \frac{W}{(w - b) \cdot t} (\rho_o + \Delta\rho_{max})$$

$$R_2 = \frac{W}{b \cdot t} \rho_o$$

$$\frac{1}{R} = \frac{1}{R_1} + \frac{1}{R_2}$$

$$= \frac{wt}{W \cdot \rho} \{1 - (\frac{w - b}{w}) \cdot \frac{\Delta\rho_{max}}{\rho}\}$$

where
$\mu_o$ = permiability in vacuum;
$t$ = thickness of element 33; and
$R_1 R_2$ = electric resistance of the hatched area and the area not hatched of the element 33.

Since the head core effeciency $\eta$ is defined by the relation $$\eta = \phi/\Phi$$

the variation in resistance of the element 33 is reduced to $(w - b)/w$. Since the head core efficiency is given by approximation $$\eta = \phi/\Phi = g/d.b/a$$

the output voltage of the head is expressed $$e = g/a \cdot b/a \cdot w-b/w$$

Thus, the output voltage $e$ becomes maximum when $b = w/2$. Thus the overlapping $b$ between the magnetic cores 30 and 31 and the element 33 is preferably one half of the width of the element 33. When the magnetic cores 30 and 31 and the element 33 are arrayed in such a manner that, as shown in FIG. 11, the thin ferromagnetic sheet 33 is formed symmetrically with respect to the center line (two-dot chain line) of the groove with the width $w_l$, the resistance $R_c$ may be reduced so that the efficiency of the magnetic cores may be considerably improved.

As described hereinbefore, according to the present invention, there may be provided the magnetoresistance type head which exhibits a high magnetic convergence effect, from which may be derived a high output voltage, and which exhibits the excellent wavelength characteristic. Furthermore, the magnetoresistance element is formed in the last step of the production process, it may be subjected to the least number of heat cycles so that its characteristics may be preserved in a very highly stable manner.

What is claimed is:

1. A magnetic head comprising a thin substantially U-shaped ferromagnetic sheet which is made of a material exhibiting magnetoresistance property and which is connected magnetically in at least one portion of a magnetic circuit having an air gap with the open end of said U-shaped ferromagnetic sheet forming at least part of said air gap, and a pair of current electrodes or terminals attached to the ends of said thin ferromagnetic sheet for receiving current flow of a predetermined magnitude through said thin ferromagnetic sheet, whereby the variation in magnetic field across said air gap of said ferromagnetic sheet may be detected as the variation in voltage across said pair of current electrodes or terminals.

2. A magnetic head as set forth in claim 1 wherein said thin ferromagnetic sheet is so formed as to define a closed magnetic circuit including an air gap having a predetermined go width, and said pair of current electrodes or terminals are attached upon said thin ferromagnetic sheet and spaced apart by a predetermined distance from each other in the direction in which the magnetic flux flows.

3. A magnetic head as set forth in claim 2 wherein two magnetic flux converging cores are attached to said thin ferromagnetic sheet and spaced apart from each other by a distance equal to said gap width.

4. A magnetic head as set forth in claim 2 wherein said thin ferromagnetic sheet is supported upon a base made of a non-magnetic material.

5. A magnetic head as set forth in claim 2 wherein the portion of said thin ferromagnetic sheet between said pair of current terminals or electrodes is linear and elongated.

6. A magnetic head as set forth in claim 5 wherein said straight portion of said thin ferromagnetic sheet has its direction of magnetization oriented in the uniaxial anisotropy axis.

* * * * *